US011151120B2

(12) United States Patent
Alagumuthu et al.

(10) Patent No.: US 11,151,120 B2
(45) Date of Patent: Oct. 19, 2021

(54) FRAMEWORK FOR DATA VALIDITY DURING DATA PROCESSING FOR MULTIPLE PROCESSING STACKS

(71) Applicant: PayPal, Inc., San Jose, CA (US)

(72) Inventors: Shanmugasundaram Alagumuthu, Milpitas, CA (US); Vikas Prabhakar, San Jose, CA (US); Ashish Srivastava, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 151 days.

(21) Appl. No.: 16/370,814

(22) Filed: Mar. 29, 2019

(65) Prior Publication Data
US 2020/0311049 A1 Oct. 1, 2020

(51) Int. Cl.
*G06F 17/00* (2019.01)
*G06F 16/23* (2019.01)
*G06F 16/25* (2019.01)
*G06Q 20/38* (2012.01)

(52) U.S. Cl.
CPC ........ *G06F 16/2365* (2019.01); *G06F 16/258* (2019.01); *G06Q 20/3827* (2013.01)

(58) Field of Classification Search
CPC .. G06F 16/2365; G06F 16/258; G06F 16/116; G06F 16/137; G06F 16/152; G06F 16/215; G06F 16/2308; G06F 16/2379; G06F 16/972; G06Q 20/3827
See application file for complete search history.

(56) References Cited

U.S. PATENT DOCUMENTS

| 6,886,018 B1* | 4/2005 | Boudris | G06F 16/258 707/625 |
| 10,073,969 B1* | 9/2018 | Faibish | G06F 16/196 |
| 2008/0189576 A1* | 8/2008 | Valentin | G06F 11/0793 714/38.14 |
| 2008/0307109 A1* | 12/2008 | Galloway | H04L 69/161 709/232 |
| 2012/0151307 A1* | 6/2012 | Abel | H04L 1/0079 714/819 |

(Continued)

OTHER PUBLICATIONS

Rathika et al., Automated Data Validation Framework for Data Quality in Big Data Migration Projects, In Proceedings of SSRG International Journal of Computer Science and Engineering, vol. 1 Issue 10, pp. 24-27, Dec. 2014.*

*Primary Examiner* — Greta L Robinson
(74) *Attorney, Agent, or Firm* — Haynes and Boone, LLP

(57) ABSTRACT

There are provided systems and methods for determining data validity during data processing for multiple processing stacks. During processing requests with a service provider, each request may go through a data flow that invokes multiple processing stacks, where the data is transmitted over a network to different data processing nodes. For example, a distributed computing architecture may invoke multiple disparate nodes to process data, which may become corrupted during data transmission and processing. To ensure data validity, a framework may be provided that provided data translators for each processing stack to covert data handled in a processing format for that stack into a base data format utilized by the framework. The framework may utilize checksums or other hash values of the data in the base data format to determine if the data has been altered at different processing nodes or stacks.

20 Claims, 5 Drawing Sheets

(56) References Cited

U.S. PATENT DOCUMENTS

| | | | |
|---|---|---|---|
| 2018/0108007 A1* | 4/2018 | Sawant | G06Q 20/3829 |
| 2019/0095941 A1* | 3/2019 | Klimczak | G06Q 20/3223 |
| 2019/0180275 A1* | 6/2019 | Safak | G06Q 20/3827 |
| 2020/0136652 A1* | 4/2020 | Chen | H03M 13/154 |

* cited by examiner

FRAMEWORK FOR DATA VALIDITY DURING DATA PROCESSING FOR MULTIPLE PROCESSING STACKS

TECHNICAL FIELD

The present application generally relates to data validity when data processing occurs in distributed computing networks, and more specifically to utilizing a hash value for data in a base data format shared between multiple processing stacks to determine if data corruption occurs.

BACKGROUND

Users may utilize communication devices to perform various actions, including use of user accounts to interact with online service providers. For example, a user may utilize a computing device to access a service provider's online platform, authenticate the user for use of an account, and/or perform electronic transaction processing using the account on the online platform. During interactions with the online service provider, the computing device may invoke certain data processing services provided by the service provider. Service providers may generally have a data processing flow between multiple data processing stacks, which each individually process at least some portion of the data. However, different data processing requirements may invoke different stacks to process the data, and data may be routed through multiple stacks during data processing. Different stacks may process data in different data formats (e.g., code), therefore, translation of data may also be necessary between stacks. This risks corruption of the data, which can cause incorrect data processing and loss for online entities and users.

Figure 1:
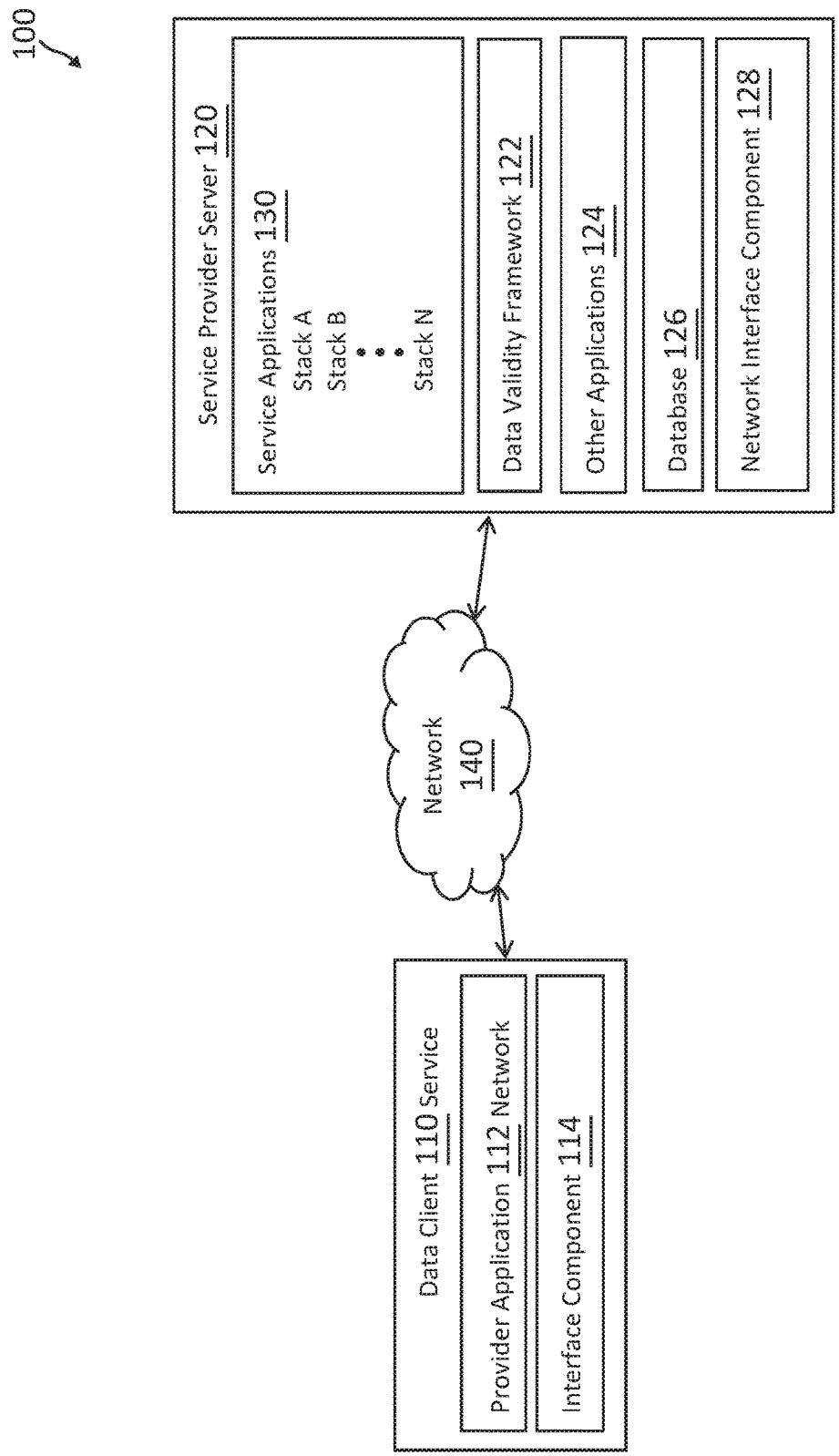
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for determining data validity during data processing with multiple processing stacks. Systems suitable for practicing methods of the present disclosure are also provided.

A user may interact with an online service provider system to perform data processing transaction, such as accessing and/or authenticating use of an account, performing electronic transaction processing, or otherwise utilize the data processing services provided by the service provider. During interactions with a service provider for processing a transaction, many different actions may be taken and application programming interfaces (APIs) of different services may be called. Data may therefore be communicated between different data processing stacks, and each of the data processing stacks may process data according to a different stack data structure. For example, multiple APIs may require risk calls, database calls and/or writes, processing calls for electronic transactions, planning calls, execution calls, or other service calls. One or more of these calls and processes may be included within a stack, and different stacks may include different processes used by a processing flow. Thus, the data may correspond to a payload for processing by a distributed computing system, as well as additional transmitted data portions (e.g., headers, metadata, and other information utilized for payload delivery). The data may therefore correspond to blocks of transmitted data for data processing by the system. The data payload, metadata, and the like may include at least some portions that remain constant through the different processing stacks. For example, at least the payload may be required to remain consistent for proper data processing, where headers and metadata with the payload may change or be irrelevant for certain stacks. In some embodiments, one or more of the payload, metadata, headers, and/or other portions of transmitted data may each be required to remain consistent. However, different portions of the data may be processed and stored separately by different processing stacks. In this regard, a data storage stack, a risk analysis stack, an execution call stack, or the like may separately process and/or store the results of processing particular portions of the payload, metadata, and the like, which may cause data inconsistencies due to data corruption.

For example, a payment processing flow may include a payment instruction generation stack, a planning stack, and an execution stack, and potentially multiple other stacks. However, different stacks may be implemented at different times by distributed computing environments, and/or different administrators may implement the stacks using different data formats and software code. To maintain data integrity, the data is to remain consistent throughout data processing, such that determining a hash value of the data in the same data format at different points during data processing yields the same hash value. However, transferring and processing data between distributed stacks may cause errors and corruption in the data, which may cause the online service provider to incorrectly process inconsistent and corrupted data. Additionally, without identifying data corruption immediately, the service provider may cause loss for users and the service provider, which may affect the provisioning of software services to users. This may occur with distributed data processors that operate in various contexts, such as online payment and transaction processing services, gaming services, merchant marketplaces, and other online distributed systems.

In order to ensure data validity during data processing by multiple stacks through services of the service provider, each transaction or data processing request may be associated with a unique identifier or hash value, such as a checksum value, which may be transmitted with the data structure between different stacks. The service provider may implement a framework for determining data validity through the use of the unique value for the data, which may be utilized by each stack that processes data for the service provider. Under this framework, prior to determining the hash value, the data may be stored according to a base data format that the data is in or converted to prior to determination of the hash value. The base data format may be a computer code format that each other computer code format used by the stacks can translate the data into when determining the hash value. For example, the base data format may correspond to a certain format that all the stacks of the service provider's software processes can use to translate data into using a data translator coded by the stacks.

Once the base data format is selected, the framework may then request that each processing stack generate a data translator from a data format (e.g., code) processed by the stack into the base data format. For example, a data translator for a specific stack may translate from C, C++, Java, or other data format into the base data format for the framework. In certain embodiments, one or more system administrators and/or stack coders may generate and provide the data translator for the specific stack. However, in other embodiments, the data translator may be implemented into a stack based on templates or exemplary translators previously used or coded for the distributed data processing system. Each stack may therefore have its own data translator for the framework, which may include data translation and coding processes for data received by the stack into the base data format. Once the data translators are generated, the translators may be implemented into the framework for data validity for the system.

Thereafter, during data processing, data may be received by the service provider's system. The data may be processed through multiple stacks in a distributed computing environment. For example, a data flow through an API may include a "SALE" stack and an "AUTHORIZE" stack for payment sales and authentications, respectively. The service provider system may define one or more data flows through the system's API and corresponding data processing stacks based on the called services. Initially, some data may be generated, validated, and sealed by a rules processing engine. For example, a payment instruction (e.g., a request from a user to pay another user or entity using an online transaction processor) may include various instructions, such as "Pay User A $100," as well as additional instructions, such as "Debit account A $100," "Credit account B $97," and "Provide service payment to service provider of $3" based on the request. Rules provided by the online service provider and transaction processor may validate that the data processing request is correct and valid, which may then be sealed confirming that the data is initially correct and valid. After generation of the data processing request, data processing stacks may then be invoked to provide data processing of the request based on the data processing flow through the system's stacks.

A first stack may receive the valid data processing request as first data for processing in a data format used by the first stack, such as a payment instruction, and may determine and utilize a data translator for the first stack for conversion of the first data to the base data format. For example, the first data may correspond to at least a portion of the data in a data format that is processable by the first stack. The data translator as part of the framework may then convert the first data in this format to the base data format implemented by the framework with the other stacks and their respective data translators. Once in the base data format, the converted first data may be used (in the base data format) to determine a hash value, checksum, or other unique identifier particular to the contents of the first data in the base data format. A hash value may be calculated using a hashing algorithm, such as a Secure Hash Algorithm (SHA) including SHA-1, SHA-2, SHA-3, or the like (e.g., SHA-5 and others). The hash function uses the converted data to generate a secure hash that represents the data and may include determination of a checksum for the converted first data. The hash or checksum generated by the algorithm may therefore represent the valid data in the base data format, and may be used to check validity, for example, by later determining another checksum for the data in the base data format (e.g., during processing of the data in a different stack) and detect errors or corruption of data. In this regard, when the hash or checksum matches the earlier and later determined values for the converted data, then the data has not been corrupted or have errors as the data is the same. However, differences in the hash or checksum indicate an error with data transfer, processing, or translation, which may call for resolution. The SHA algorithm may be selected to minimize bandwidth usage and hash size, while also avoiding collision where two different data structures have the same hash value. In some embodiments, the checksum or other hash value may be determined and appended to the first data or used to seal the first data prior to the first stack receiving the first data.

Once the first stack seals the first data with the checksum or other hash, the first stack may transmit the first data to a second stack for processing as dictated by a data processing flow of the system. This may occur after or during processing, by the first stack, of the first data in the first data format. The data processing flow may define the next data processing stacks that are to be invoked to process the data. Prior to or when the second stack receives the first data, the first data may be translated or transferred to a second data format processed by the second stack. In some embodiments, the data formats may be the same, and therefore the first data does not need to be translated to a different format. However, where the data formats used by the two stacks are different, the data would be translated to a format processable by the second stack. Moreover, a same stack may utilize different data formats and/or data structures, where a processing stack may convert the first data to a different data format or structure within the same stack. The first data may be converted to second data, which corresponds to the first data in the second data format. However, the checksum or other hash may be retained in order to check data validity. The second stack may then process this second data using the data format and processes of the second stack. Additionally, prior to processing the second data, the second stack may utilize its respective data translator in the framework to convert the second data to the base data format, which should correspond to the same base data determined by the first stack if the second data was not corrupted. The second stack may then determine the checksum or other hash using the same SHA or other algorithm and may compare values of the hash received from the first stack and the hash determined by the second stack.

Thereafter, the data structure for the data processing request may pass through multiple data processing stacks while sealed with the checksum or other hash, where each processing stack may utilize its respective data translator to translate the data in different formats processed by the stacks, determine a hash value, and then proceed to validate the data. For example, the second stack may validate the data by comparing hash values, and if validated, may transmit the data to a subsequent stack, which may in turn perform similar validation processes to the first and second stacks. Each subsequent stack may receive the data in a particular data format and may translate the data into a data format used by the subsequent stack if necessary. Prior to processing the data, the subsequent stack may utilize a data translator implemented through the data validity framework to convert the data used by that processing stack to the base data format. The data validity framework's hashing algorithm may be used with the converted data in the base data format to determine the checksum at the subsequent processing stack and may then compare values to validate that the data has not been corrupted during transmission or translation. In some embodiments, multiple stacks may work on the data concurrently, and may validate the data at each stack before processing the data and transmitting the data to further stacks down the processing pipeline.

If the hash values match, then the second (or subsequent) stack may determine that the data is valid and was not corrupted during transfer and/or translation (e.g., based on system or data transmission errors, etc.). However, if the hash value does not match the two or more stacks based on the data in the base data format, then the stacks and framework may determine that an error occurred with the data and the data is corrupted. If the data is determined to be corrupted, then the stack identifying the corrupted data, and/or the framework may request retransmission of the data from the previous stack or receipt of the initially valid and sealed data for the processing request based on the system rules. The framework may also notify an administrator of the system or other entity of the corrupted data so that the data may be validated again before processing of the corrupted data. Once the data is finished being processed it may be stored and reside in a database of the system with the hash value determined using the base data format of the data.

In this manner, a service provider may generate hash values using a framework having multiple data translators for stacks in a distributed system to help prevent data corruption and processing of erroneous data. This allows the service provider to validate data processing requests and prevent processing of data that was corrupted during data processing. By validating data, the service provider can provide better data processing services to users and also prevent loss by the service provider or users when incorrect data is processed. Moreover, the data validity framework may help prevent reprocessing of data when data is later detected to have been corrupted. For example, after-the-fact detection of data corruption that does not occur until after data is processed increases data processing time and further utilizes computing resources to identify invalid data and correct the results. However, the data validity framework discussed herein allows for detection of data corruption at the time of corruption and prior to data processing, correcting any data validity issues prior to utilizing processing resources. This provides an improved distributed processing system that limits wasted resources due to errors in data processing, transmission, and/or translation between distributed processing stacks.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a data client 110 and a service provider server 120 in communication over a network 140. A user (not shown) may utilize data client 110 to utilize the various features available for data client 110, which may include processes and/or applications that may interact with services provided by service provider server 120 to process data. Service provider server 120 may therefore generate a transaction based on a data processing request, where the transaction includes data processed by the APIs of various called or invoked services of service provider server 120. For example, the data may include a payment instruction processed using multiple software processing stacks of service provider server 120. The data may become associated with a hash value, such as a checksum, once the data is validated using processing rules. The hash value may be determined in a base data format associated with a data validity framework. As the data is processed by each individual stack, the hash value may be used by the stack to ensure data validity by using data translators to convert the data to the base data format, determine the hash value using the same algorithm, and compare values.

Data client 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Data client 110 may be implemented as a communication device that may utilize appropriate hardware and software configured for wired and/or wireless communication with service provider server 120, which may include personal and mobile computing devices of individual and/or groups of customers of service provider server 120, such as single users, merchants, and/or other entities. For example, in one embodiment, data client 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Data client 110 of FIG. 1 contains a service provider application 112 and a network interface component 114. Service provider application 112 and other applications 114 may correspond to executable processes, procedures, and/or applications with associated hardware. In other embodiments, data client 110 may include additional or different modules having specialized hardware and/or software as required.

Service provider application 112 may correspond to one or more processes to execute software modules and associated devices of data client 110 to send, receive, and/or process data with service provider server 120, for example, by accessing a website or other online platform of service provider server 120 and request data processing through one or more services of service provider server 120. In this regard, service provider application 112 may correspond to specialized hardware and/or software utilized by a user of data client 110 to access service provider server 120 and request data processing, for example, by requesting processing of a payment instruction using one or more data flows through the services provided by service provider server 120. Thus, service provider application 112 may provide one or more convenient interfaces capable of displaying data and processes accessible from service provider server 120. In some embodiments, service provider application 112 may permit a user to browse information available over network 140 including accessing webpages, entering information from webpages, navigating websites, and providing posts or messages through websites and online platforms. In certain embodiments, service provider application 112 may be implemented as a web browser configured to view information available over the Internet or access a website of a website provider. In other embodiments, service provider application 112 may be a dedicated application used for message exchange and/or posting.

Service provider application 112 may correspond to a device application, which may be utilized to perform various online and/or virtual actions, including messaging, electronic transaction processing, merchant shopping and purchasing, social networking, and other types of electronic actions. For example, service provider application 112 may correspond to Internet browsers (e.g., browser histories and online interactions), payment and electronic transaction processing applications, social networking applications, microblogging applications, video games, merchant and shopping applications, mapping applications, or other types of device applications that may be utilized to interact with service provider server 120 to utilize a distributed computing architecture. During payment data and/or transaction processing, service provider application 112 may be utilized to select payment instrument(s) for use in providing payment for a purchase transaction, transfer, or other financial process and enter a payment or electronic transaction processing flow with service provider server 120. As discussed herein, service provider application 112 may utilize user financial information, such as credit card data, bank account data, or other funding source data, as a payment instrument when providing payment information. Additionally, service provider application 112 may utilize a digital wallet stored with an account with a payment provider, such as service provider server 120, as the payment instrument, for example, through accessing a digital wallet or account of a user with service provider server 120 through entry of authentication credentials and/or by providing a data token that allows for processing using the account. Service provider application 112 may be used to enter and/or receive transaction data, including a merchant, merchant device, merchant location, or other identifier, which may be processed through a data flow with service provider server 120.

Data client 110 includes at least one network interface component 114 adapted to communicate with service provider server 120. In various embodiments, network interface component 114 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Network interface component 114 may communicate directly with nearby devices using short range communications, such as Bluetooth Low Energy, LTE Direct, WiFi, radio frequency, infrared, Bluetooth, and near field communications.

Service provider server 120 may be maintained, for example, by an online service provider, which may provide payment and other data processing features to users through implemented services of service provider server 120. In this regard, service provider server 120 includes one or more processing applications which may be configured to interact with data client 110 and/or another device/server to facilitate data processing transactions. In one example, service provider server 120 may be provided by PayPal®, Inc. of San Jose, Calif., USA. However, in other embodiments, service provider server 120 may be maintained by or include another type of service provider, which may provide the aforementioned services to a plurality of users.

Service provider server 120 of FIG. 1 includes service applications 130, a data validity framework 122, other applications 124, a database 126, and a network interface component 128. Service applications 130, data validity framework 122, and other applications 124 may correspond to executable processes, procedures, and/or applications with associated hardware. In other embodiments, service provider server 120 may include additional or different modules having specialized hardware and/or software as required.

Service applications 130 may correspond to one or more processes to execute software modules and associated specialized hardware of service provider server 120 to provide services to users for data processing transactions generated when the users use services provided by service provider server 120, for example, when users enter a data processing flow with service applications 130. In some embodiments, service applications 130 may provide payment, purchasing, and/or transfer services to the users, for example though a payment account and/or payment instruments of the user and to other users, merchants, or entities. In this regard, service applications 130 may correspond to specialized hardware and/or software to provide payment services and payment accounts through software services, which may be provided through stacks A-N. Stacks A-N may correspond to software execution stacks of service applications 130 that provide data processing services to service provider server 120, for example, to process data received from clients based on instructions. In some embodiments, stacks A-N may allow for a payment to a user and/or merchant through a payment instrument, including a credit/debit card, banking account, payment account with service provider server 120, and/or other financial instrument.

In order to establish a payment account for a user to send and receive payments, one or more of stacks A-N may also be invoked to generate, access, authenticate, and provide a payment account and/or other payment services through payment instruments. The information processed by stacks A-N may include user personal and/or financial information. Additionally, the information may include authentication information, such as a login, account name, password, PIN, or other account creation information. The user may provide a name, address, social security number, or other personal information necessary to establish an account and/or effectuate payments. Service applications 130 may further allow the user to use stacks A-N to maintain the payment account, for example, by adding and removing payment instruments. In order to perform transaction processing and/or payments, service applications 130 may utilizes stacks A-N to receive and/or generate payment transaction data and process the data through stacks A-N, such as by generating a payment instruction and processing the payment instruction through stacks A-N. One or more of stacks A-N may also provide for rule-based validation when initially generating the payment instructions. Service applications 130 may also be used to debit an account of the user and provide the payment to an account of the merchant or other user. Service applications 130 may also be used to provide transaction histories for processed transactions.

Data validity framework 122 may correspond to one or more processes to execute software modules and associated specialized hardware of service provider server 120 to validate data received by one or more of data processing stacks A-N when the data is processed through a processing flow that invokes one or more of stacks A-N. In this regard, data validity framework 122 may correspond to specialized hardware and/or software to utilize a hash value of data in a base data format to protect from corruption of stack data during processing and transmission between stacks A-N. For example, as a transaction is first initiated with service applications 130 for processing, a payment instruction may be generated, validated using business rules and validation information for service applications 130, and a hash value, such as a checksum may be appended to or used to seal the data. Data validity framework 122 may utilize a base data format that is implemented across all of stacks A-N for adoption with the data validity network (e.g., for implementation with a data translator to translate data into the base data format). The base data format may be used for determination of the hash value by a hashing algorithm used on data in the base format. The hash value may be determined using an SHA algorithm or other hashing algorithm. The hashing algorithm may be selected to reduce bandwidth consumption by having a lengthy hash value while still providing collision avoidance when hash values are the same but the data is different.

In order to determine the hash value, data validity framework 122 may incorporate a data translator for each of stacks A-N that translates data coded in the format used for processing by the stack into the base data format that may be used for determination of the checksum or other hash value. In some embodiments where the stacks utilize the same data format for processing of data, a data translator may be shared between one or more stacks. Data validity framework 122 may request an administrator or coder to generate the data translator for the particular stack that converts data received and processed by that stack in the data format used by that stack into the base data format. In some embodiments, data validity framework 122 may provide one or more templates, exemplary code structures, software development kits, or other information that may be used for generation of the data translator. Thus, data validity framework 122 may include one or more data translators associated with stacks A-N in order to provide data validity. Once a data translator is generated for each of stacks A-N (or those utilized for a particular data flow), data validity framework may then implement data validity protection for service applications 130.

Thereafter, when receiving a data processing request having data, such as a payment instruction, data validity framework 122 may be engaged by service applications 130 to ensure data validity and prevent processing of corrupt data. In this regard, after generation of data that is validated, such as a payment instruction validated using rules for service applications 130, the data may be converted to the base data format if not already in that format, and a hash value may be calculated using a hashing algorithm. The hash value may be attached to, appended to, or used to seal the data, which may then be processed using one or more processing stacks A-N depending on the data processing flow for the data using service applications 130. During processing of the data, each of the invoked stacks A-N may utilize the data translator for the corresponding one of stacks A-N to translate the data into the base data format. The corresponding one of stacks A-N receiving the data for processing may then determine a hash value of the converted data in the base data format using data validity framework 122 and the hashing algorithm, and may compare that hash value to the hash value that was received with the data (e.g., based on the hash value being appended to or used to seal the data prior to transmission and processing by the stack). If the hash values match, then the stack can determine that that the data was not corrupted during processing or transmission between stacks A-N. However, if the values do not match, then the data has become corrupted, which would cause generation of a new hash value. To resolve the corrupted data, data validity framework 122 may be used to request the data from an earlier stack, including the previous stack processing data or the first stack that generates and seals the data using rules, and/or may be used to request maintenance and review of the data by a system administrator. Thus, data validity framework 122 may also provide processes to handle erroneous or missing data, as well as detect differences in stack data. Data validity framework 122 may also output information on one or more data flows based on detection of corrupt data, which may be used to determine issues in data processing and transfer between stacks.

In various embodiments, service provider server 120 includes other applications 124 as may be desired in particular embodiments to provide features to service provider server 120. For example, other applications 124 may include security applications for implementing server-side security features, programmatic client applications for interfacing with appropriate application programming interfaces (APIs) over network 140, or other types of applications. Other applications 124 may contain software programs, executable by a processor, including a graphical user interface (GUI), configured to provide an interface to the user when accessing service provider server 120, where the user or other users may interact with the GUI to more easily view and communicate information. In various embodiments, other applications 124 may include connection and/or communication applications, which may be utilized to communicate information to over network 140.

Additionally, service provider server 120 includes database 126. As previously discussed, a user may establish one or more digital wallets and/or payment accounts with service provider server 120. Digital wallets and/or payment accounts in database 126 may include user information, such as name, address, birth date, payment instruments/funding sources, additional user financial information, user preferences, and/or other desired user data. Users may link to their respective digital wallets and/or payment accounts through an account, user, and/or device identifier. Thus, when an identifier is transmitted to service provider server 120, e.g., from data client 110, one or more digital wallets and/or payment accounts belonging to the users may be found. Database 126 may also store stack data for different processing flows, as well as data that is processed through the data flows. The stack data may include unique identifiers, such as hash values or checksums, generated for the data and used to determine data validity.

In various embodiments, service provider server 120 includes at least one network interface component 128 adapted to communicate data client 110 over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
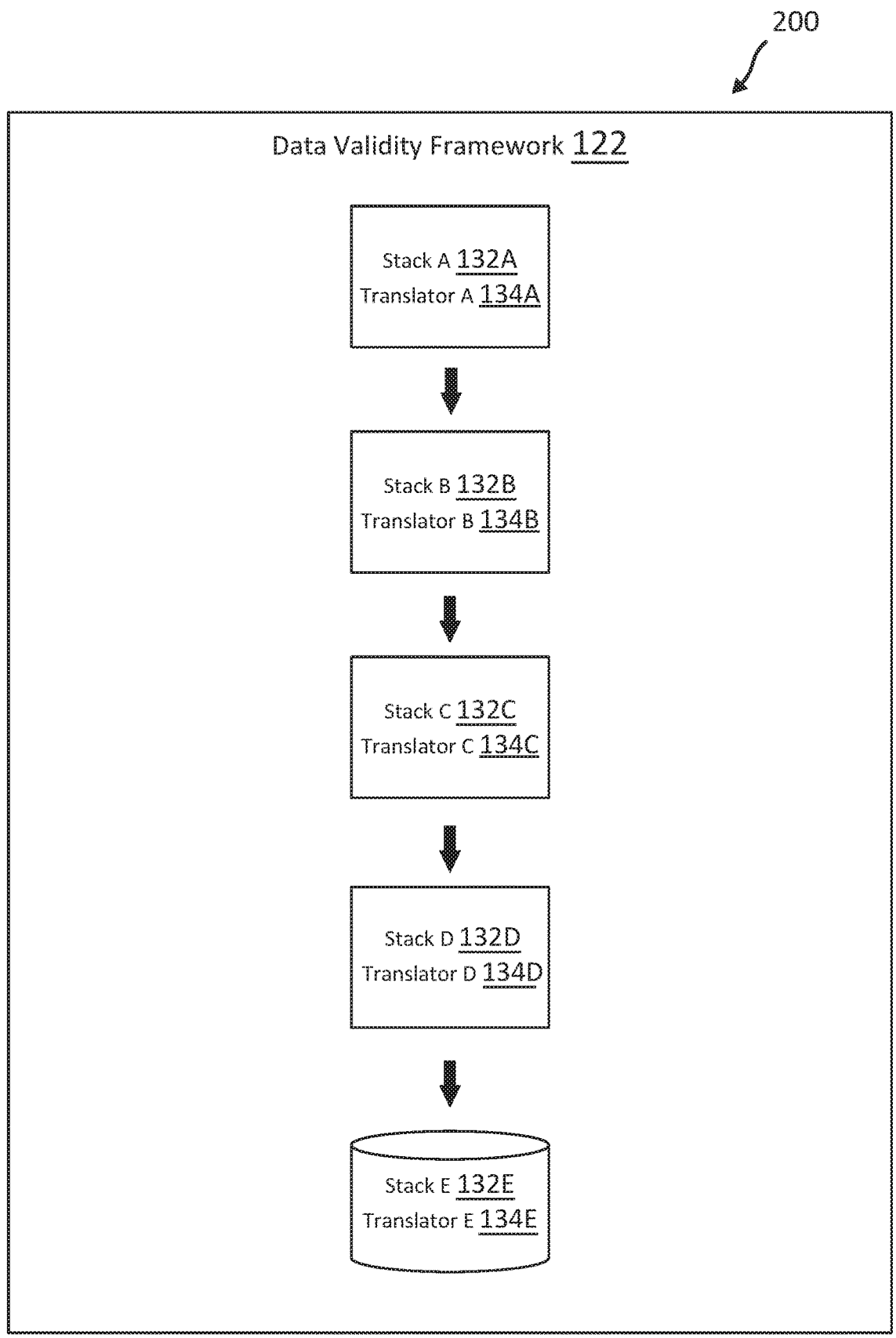
FIG. 2 is a block diagram of a framework that determines data validity to prevent data processing of corrupted data, according to an embodiment.

FIG. 2 is a block diagram of a framework that determines data validity to prevent data processing of corrupted data, according to an embodiment. Environment 200 of FIG. 2 displays stacks that utilize data validity framework 122 to prevent erroneous data processing, such as due to a computing error at the time of data logging, processing, or transmission stack data, such as a memory error, interrupt, or the like. In this regard, data validity framework 122 may be implemented by a system of a service provider, such as an online transaction processor or other distributed computing environment such as service provider server 120 in system 100 of FIG. 1.

Data validity framework 122 is shown with various data, stacks, and data translation processes for stack that may be used to detect whether data is erroneous due to missing data, data corruption, and the like. For example, data processed by a system, such as a payment instruction processed using a distributed transaction processor, may be associated with a hash value computed from the data, for example, by mapping the data to a particular data of a fixed size and structure using a table, algorithm, or other process. For example, a checksum may be determined from a block of digital data by utilizing an algorithm to determine a value from data used as input. The algorithm creates a value that differs, possibly significantly, even from small changes to the input data. Therefore, when data becomes corrupted or erroneous during processing and transmission between network nodes, processing stacks, and like, the changes to the data may be detected by having a different checksum computed using the same checksum algorithms. The algorithm may be selected to minimize bandwidth usage by the checksum value while also preventing or minimizing collision when two checksums are the same, but the input data is different. In this manner, checksums may be used to verify data validity and integrity.

Thus, data validity framework 122 may utilize checksums determined from data when the data is in a base data format to determine whether the data is erroneous prior to or during processing by a stack when a data flow utilizes multiple processing stacks. In order to detect that data is erroneous prior to processing by a stack and transmitting the data to additional stacks, data validity framework 122 may provide the base data format that may be accessible to convert the data through one or more data translators that provide a process to convert or translate the data from a processing format or code used by the stack to the base data format. For example, environment 200 shows Stacks A-E 132A-E that are associated with data validity framework 122 and utilize data validity framework 122 for checking data validity. Each of Stacks A-E 132A-E are associated with a Translator A-E 134A-E respectively, which may be implemented specifically for the corresponding one of Stacks A-E 132A-E. Translators A-E 134A-E may be coded specifically for the corresponding one of Stacks A-E 132A-E or may be generated for another stack using the same coding or scripting language, or through templates and source code provided by data validity framework 122.

Prior to processing when data is initially generated and validated using rules, the data may be converted to a base data format or may initially be generated in the base data format, and a checksum or other hash value may be determined and used to seal the data. For example, when providing validation of the payment instruction, one or more routines may be executed to ensure that the data is correct. This may include, for a payment instruction, that a credit and debit side match, presence of particular fee credit instructions, currency conversions are equivalent, negative balance recovery amounts match debit amounts, that there is no negative currency or value amounts, and presence of incentive funding instructions. In other embodiments, the first processing stack after data generation may instead determine the checksum and seal the data. During each iteration of data processing by one of Stacks A-E 132A-E, Stacks A-E 132A-E may determine and access their corresponding Translator A-E 134A-E in order to convert the data received by that processing stack to the base data format implemented by data validity framework 122.

For example, Stack A 132A may correspond to a "teplanningserv" stack, which may provide payment instruction generation and planning through a processing stack. Stack A 132A may first receive the data and checksum of the data determined from the data in a base data format. The data may be in a coding format understood by Stack A 132A or Stack A 132A may convert the data into the format handled by Stack A 132A. After receiving the data in the processing format for Stack A 132A, Translator A 132A may be invoked in order to convert the data to the base data format. A checksum may then be calculated and compared to the received checksum with the data. When the checksums match, the data is valid. If the checksums do not match, then the data is invalid and erroneous, thereby requiring resending of the data or fixing by a system element. If the data is valid and Stack A 132A finishes processing the data, the data may be next sent to Stack B 132B, which may repeat the process using Translator B 134B. In this regard, Stack B 132B may correspond to a "paymentsetupserv" stack, which provides setup of payment instruction processing for subsequent stacks. Additional ones of Stacks C-E 132C-E may provide different processes and calls, such as execution, risk analysis, and the like.

Figure 3:
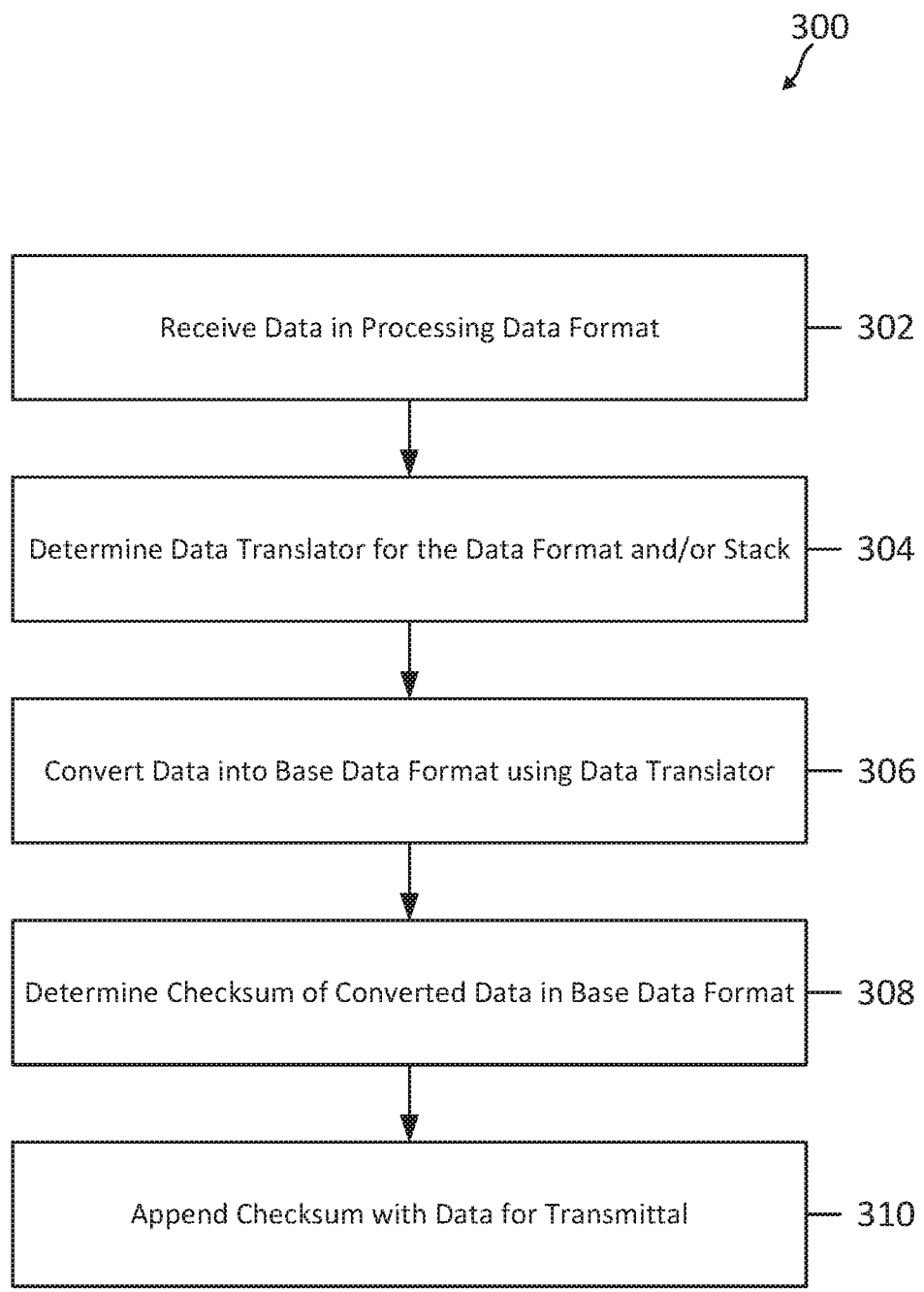
FIG. 3 is a flowchart of an exemplary process for generating a hash value in a base data format by a processing stack that utilizes the hash value to determine data validity, according to an embodiment.

FIG. 3 is a flowchart of an exemplary process for generating a hash value in a base data format by a processing stack that utilizes the hash value to determine data validity, according to an embodiment. Note that one or more steps, processes, and methods described herein of flowchart 300 may be omitted, performed in a different sequence, or combined as desired or appropriate.

At step 302 of flowchart 300, data is received in a processing data format. The processing format may correspond to a data format used by a processing stack to process data and/or may correspond to an initial data format used to generate the data by a stack. The data may correspond to a processing request for particular data by a system, which utilizes multiple stacks in a distributed computing environment or architecture to process data through a data flow. For example, the data may correspond to a payment instruction, which may include all the details and data necessary to process through a data processing flow of an online transaction processor to perform money movement actions. This may include instructions for amounts to be debited, credited, or charged as a fee, currency conversions, recovery details for negative balances, etc. For example, an exemplary payment instruction may include a sender's credit card or stored value in a payment account, a fee charged by a transaction processor, and a recipient's stored value or card for crediting. Other payment instructions may include additional details, such as partner transaction fees, recovery information, etc.

Thereafter, in order to ensure data integrity, a checksum may be generated and used to seal the data so that as the data travels through the processing ecosystem, the checksum may be used to validate the data as not being corrupted or erroneous due to errors. Thus, as step 304, a data translator for the data format and/or stack is determined. The data translator may be an initial translator when the initially generated and validated data is not in the base data format used by the data validity framework. Where the data is instead received by a processing stack, the processing stack may invoke the data translator utilized by the processing stack for data conversion and translation into the base data format. The data translator may be previously generated for the particular processing data format for the data and/or utilized by the stack. Once the data translator is determined, at step 306 the data is converted into the base data format using the data translator, which may correspond to converting or translating a specific coding or scripting language for the data into the base data format.

At step 308, a checksum of the converted data in the base data format is determined. The checksum may be generated using a hashing algorithm, such as SHA-2, SHA-5 or the like. The algorithm may accept blocks of data as the input and produce a fixed a fixed-size hash value as the output. The main objective of this algorithm is to generate a hash value that ensures data integrity by determining whether the data has been changed. When the data is changed, a new hash value would be computed by the same algorithm, thereby allowing for comparisons in hash values to determine data corruption. The checksum may therefore be used to ensure data validity when the data travels through an ecosystem so that the data may be checked at various points (e.g., new processing stacks in a data flow) using the checksum to determine if the data has changed (e.g., been corrupted). Once the checksum is determined, at step 310, the checksum is appended to the data for transmittal, for example, by being used to seal the data with the checksum to be used to check data validity. This may then be utilized to detect differences in data as processing stacks receive the data, as discussed in reference to FIG. 4.

Figure 4:
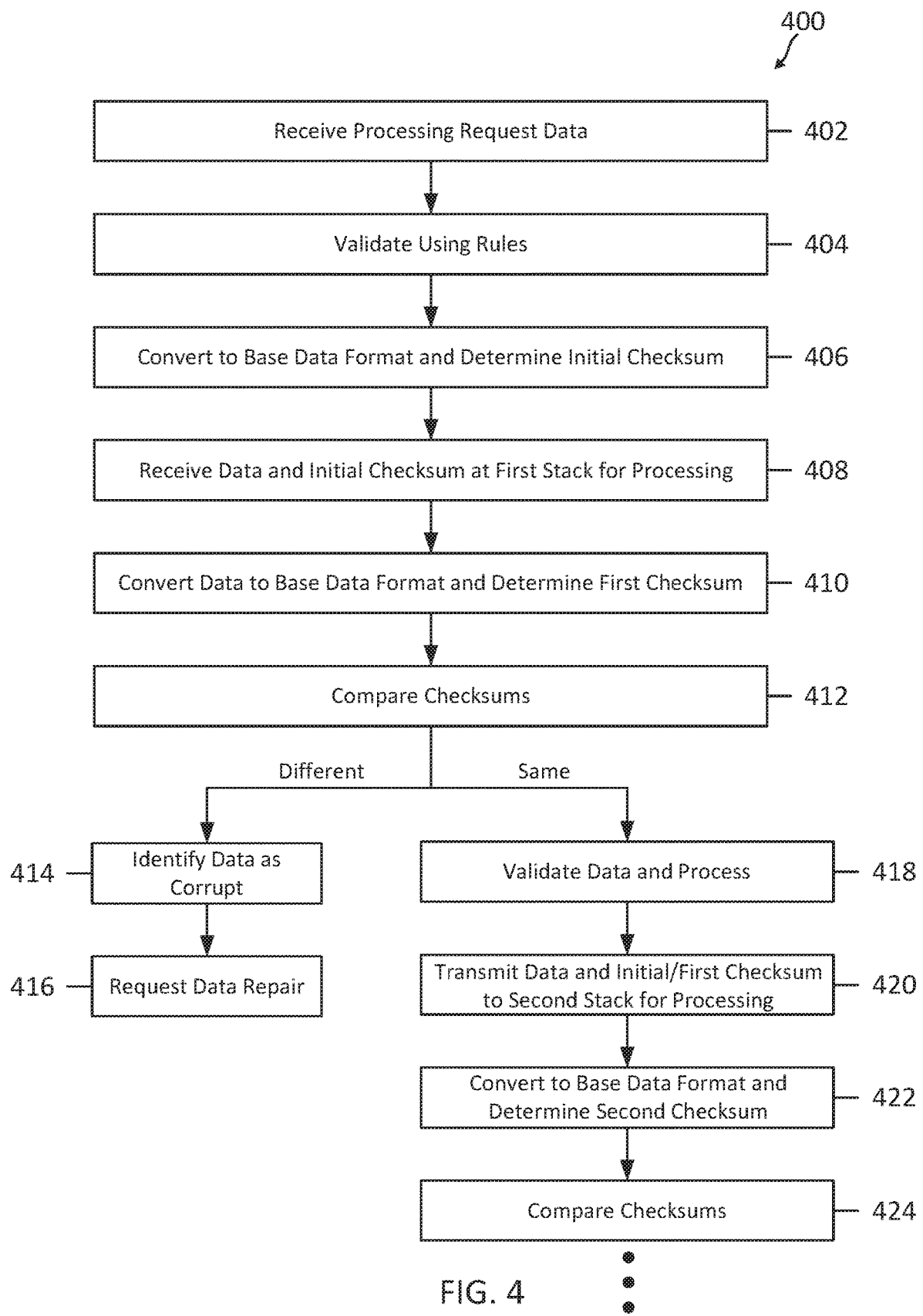
FIG. 4 is a flowchart of an exemplary process for determining data validity during data processing between multiple processing stacks, according to an embodiment.

FIG. 4 is a flowchart of an exemplary process for determining data validity during data processing between multiple processing stacks, according to an embodiment. Note that one or more steps, processes, and methods described herein of flowchart 400 may be omitted, performed in a different sequence, or combined as desired or appropriate.

At step 402 of flowchart 400, processing request data is received, which may correspond to a payment instruction to be processed through a data flow of a transaction processing system. The processing request data may be generated through an interaction with a user device or other data client, which may generate the data based on interactions with the system. The processing request data is then validated using rules for the system, at step 404, which may be used to ensure that the initial data for processing by stacks of the system is valid and proper. This prevents invalid data from being processed, which would then affect data processing through each subsequent processing stack. In order to seal the valid data for the processing request, at step 406, the data is converted to base data in a base data format, and an initial checksum is determined. The base data format may be agreed on by the framework and each processing node or stack so that the framework utilizes a base data format for checksum generation and matching. The base data format may be an initial format used to receive a request, generate data, and validate the data using rules at steps 402 and 404. The base format may also be another data format, such that a data translator is invoked at step 406 in order to convert the validated data into the base data. Once in the base data format, the initial checksum may be determined using a hashing algorithm to generate a checksum based on the data block(s) received by the framework.

The data is sealed using the initial checksum and is then processed through the data flow of the system for the processing request. Thus, at step 408, the data and the initial checksum are received at a first stack for processing. The first stack may correspond to a processing node of a distributed computing system that processes the data, for example, by performing some operation with the data. In some embodiments, prior to or when received by the first stack, the data may be converted to a different data format or computing code that is utilized by the particular stack. However, this may be unnecessary where the stack uses the same format as a previous stack or previous iteration of the data. Once received by the stack, at step 410, the data is converted again to the base data format and a first checksum is determined for the data that was received by the first processing stack. The data may be converted using a data translator for the particular processing stack, which may be implemented in the framework for the processing stack by one or more system administrators or the framework based on previous code templates. The first checksum may be calculated using the same hashing function so that the first checksum should match the initial checksum if the data is not corrupted.

Thereafter, the initial checksum used to seal the data prior to transmission to the first stack is compared to the first checksum determined by the first stack using the framework, data translator, and hashing function. If the checksums are different, the data is identified as corrupt, at step 414. This is caused by errors or changes in the data that cause computation of a different value when using the hashing algorithm. Thus, at step 416, data repair is requested, including resending of data or system/data maintenance. However, if the checksums are determined to be the same, then the data is validated at step 418, and the data is processed by the first stack. Thus, the hashing algorithm may be used to determine data validity by generating the same checksum when the data is the same in the base data format between different nodes on the distributed computing architecture. After processing the data, the data is transmitted with the checksum to a second stack for processing, at step 420. The checksum used to seal and/or transmit the data from the first stack to the second stack may again be the initial checksum or the first checksum as both checksums are the same when the data is valid. Thus, the data may again be sealed/transmitted with the checksum that matches the initial and first checksum. The second stack may be used to further process the data, for example, by performing another operation for the data processing flow. The data may be changed to a different data format for processing by the second stack if necessary. Additionally, to check for data validity at the second stack, the data (in the new data format where necessary) is converted to the base data format again using a data translator, and a second checksum is determined, at step 422. The second checksum in the base data format may be determined using the hashing algorithm for the framework such that the second checksum determined at the second stack should match the initial/first checksum transmitted with the data to the second stack. Thereafter, the checksums are compared, at step 424, to determine data validity and the process may proceed similarly to steps 412-422 for validation of the data and processing by further data processing stacks.

Figure 5:
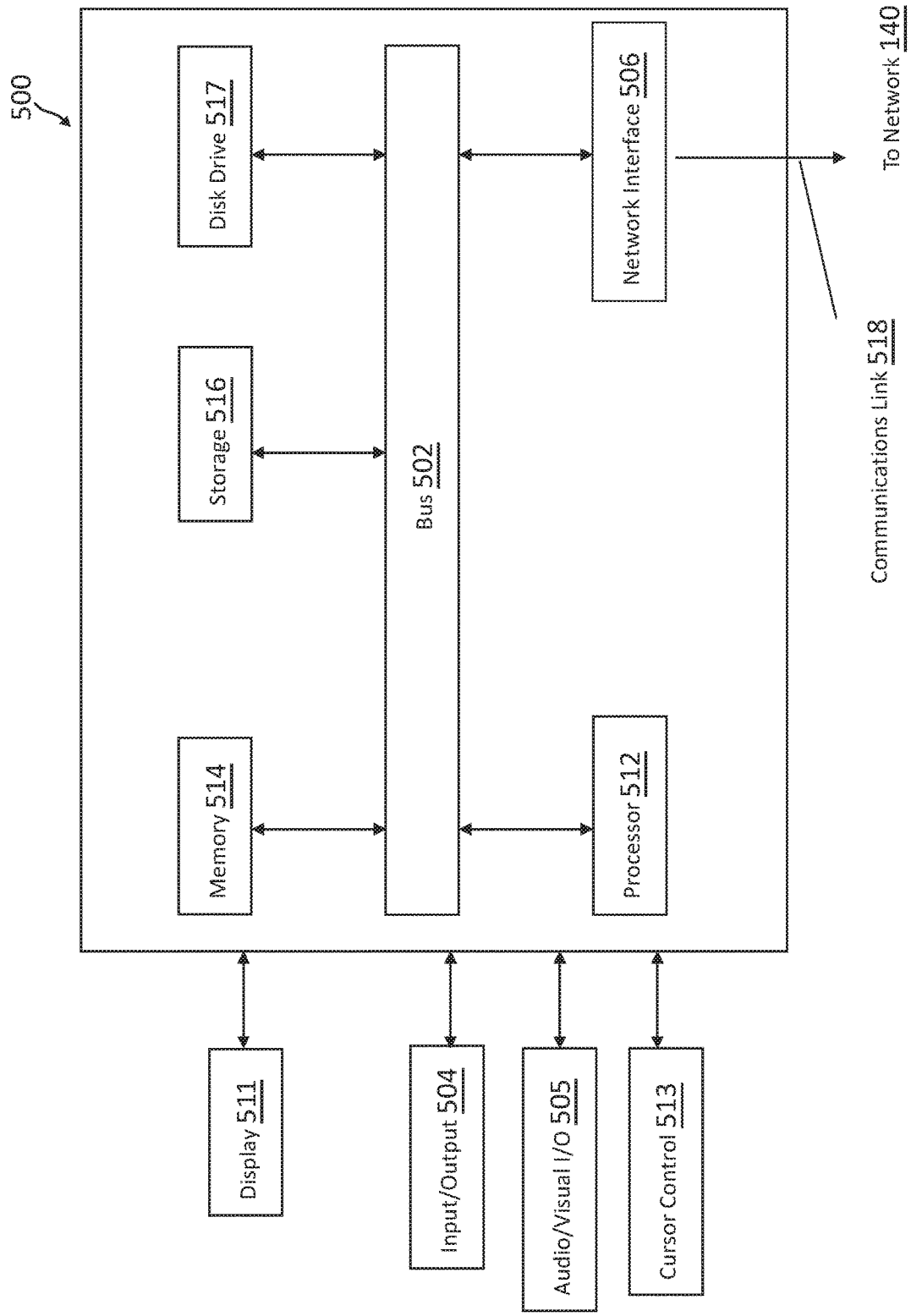
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
 a non-transitory memory storing instructions; and
 one or more hardware processors coupled to the non-transitory memory and configured to read the instructions from the non-transitory memory to cause the system to perform operations comprising:
 receiving a transaction processing request for a transaction between a first account of a first user and a second account of a second user, wherein the transaction processing request comprises authentication information for the first account and an amount to be paid to the second account from the first account;

generating first data comprising a payment instruction having the authentication information and the amount in a base data format;

transmitting the first data to a first data processing stack in a first coding format compatible with the first data processing stack, wherein the first data processing stack processes the authentication information in the payment instruction;

receiving, by a data integrity validation framework of the system, the first data from the first data processing stack in the first coding format;

converting, by the data integrity validation framework, the first data to the base data format using a first data translator associated with the first data processing stack;

generating, by the data integrity validation framework, a first checksum of the converted first data in the base data format;

transmitting, by the first data processing stack, the first data sealed with the first checksum to a second data processing stack, wherein the second data processing stack processes the amount to be paid to the second account from the first account in the payment instruction;

receiving, by the data integrity validation framework, second data from the second data processing stack in a second coding format, wherein the second data is based on the first data received by the second data processing stack;

converting, by the data integrity validation framework, the second data to the base data format using a second data translator associated with the second data processing stack;

determining, by the data integrity validation framework, a second checksum of the converted second data in the base data format; and determining if the second checksum matches the first checksum.

2. The system of claim 1, wherein the operations further comprise:

in response to determining that the second checksum is different from the first checksum, determining that there is an error in at least one of the transmitting the first data to the second data processing stack or the converting the first data to the second data.

3. The system of claim 2, wherein the operations further comprise at least one of one of sending an alert of the error or requesting a retransmission of the first data with the first checksum from the first data processing stack.

4. The system of claim 1, wherein the operations further comprise:

in response to determining that the second checksum matches the first checksum, validating the second data with the second data processing stack.

5. The system of claim 1, wherein the first data processing stack and the second data processing stack are from a plurality of data processing stacks, and wherein the operations further comprise:

performing data validation using the first checksum and the base data format at each of the plurality of data processing stacks during data processing.

6. The system of claim 1, wherein prior to receiving the first data, the operations further comprise:

requesting the first data translator from the first data processing stack and the second data translator from the second data processing stack, wherein the first data translator is requested for the first coding format and the second data translator is requested for the second coding format.

7. The system of claim 1, wherein the first data and the second data comprise at least a portion of the payment instruction processed by the system, and wherein the at least the portion comprises at least one of the authentication information or the amount to be paid to the second account from the first account.

8. The system of claim 7, wherein prior to receiving the first data, the operations further comprise:

validating the payment instruction based on one or more rules prior to processing by the first data processing stack, wherein the first data processing stack and the second data processing stack perform data processing operations for electronic transactions processed by the system.

9. The system of claim 1, wherein the first code format and the second coding format comprise different coding languages.

10. The system of claim 1, wherein the operations further comprise:

determining, by the data integrity validation framework, the first data translator for the first data processing stack, wherein the first data translator comprises a first data translation process; and determining, by the data integrity validation framework, the second data translator for the second data processing stack, wherein the second data translator comprises a second data translation process.

11. A method comprising:

accessing, by a data integrity validation framework, first data and a first checksum within a first node of a distributed computing architecture, wherein the first data comprises at least a portion of a payment instruction having authentication information for a first account and an amount to be paid to a second account from the first account for an electronic payment transaction;

determining a first data translation process for the first node with the data integrity validation framework, wherein the first data translation process is configured to convert the first data to a base data format for the data integrity validation framework;

determining base data for the first data in the base data format using the first data translation process, wherein the base data comprises the payment instruction generated in the base data format in response to receiving the electronic payment transaction between the first account and the second account;

determining a second checksum of the base data; and validating the first data based on the first checksum and the second checksum.

12. The method of claim 11, wherein prior to accessing the first data, the method further comprises:

implementing the first data translation process for the first node, wherein the first data translation process is implemented specifically for a first data format processed by the first node based on code written for the first node.

13. The method of claim 11, wherein the validating the first data comprises determining the first checksum matches the second checksum.

14. The method of claim 11, wherein the first data is sealed using the first checksum and comprises the payment instruction for the electronic payment transaction, and wherein the first data is generated by the first node on a receipt of the at least the portion of the payment instruction by the first node.

15. The method of claim 11, wherein the first data and the first checksum are received from a second node that previously generated the first checksum using a second data translation process for a coding language used by the second node.

16. The method of claim 11, further comprising receiving a processing request, prior to the accessing, for processing through multiple stacks of the distributed computing architecture.

17. A system comprising:
- a non-transitory memory storing instructions; and
- one or more hardware processors coupled to the non-transitory memory and configured to read the instructions from the non-transitory memory to cause the system to perform operations comprising:
  - receiving first data and a first hash value appended to the first data from a first software stack of a distributed computing system, wherein the first data is in a first coding format, wherein the first data and the first hash value originate from a second software stack of the distributed computing system, and wherein first hash value represents at least a portion of the first data in a base data format;
  - converting, by a data validity framework of the system, the first data in the first coding format to the base data format using a first data translator;
  - calculating, by the data validity framework, a second hash value of the converted first data in the base data format using a hashing function associated with the first hash value, wherein the second hash value is associated with the at least the portion of the first data in the base data format;
  - comparing, by the data validity framework, the first hash value to the second hash value; and
  - validating, by the data validity framework, the first data based on the comparing, wherein the validating comprises:
    - determining whether the first hash value is a same hash value as the second hash value; and
    - issuing a validation that the first data is not corrupted when the first hash value is the same hash value as the second hash value.

18. The system of claim 17, wherein the operations further comprise:
- sealing, by the data validity framework, the first data prior to transmission to a third software stack using the same hash value.

19. The system of claim 17, wherein the first hash value is not the same hash value as the second hash value, and wherein prior to the issuing the validation, the operations further comprise requesting reconciliation of corruption of the first data based on the first hash value not being the same hash value as the second hash value.

20. The system of claim 17, wherein the first hash value is the same hash value as the second hash value, and wherein the validation indicates that the first data was not corrupted by at least one of the first software stack or the second software stack.

* * * * *